(12) United States Patent
Daubinger et al.

(10) Patent No.: US 6,250,464 B1
(45) Date of Patent: Jun. 26, 2001

(54) CARRIER STRIP FOR FASTENING ELEMENTS AND A MAGAZINE WITH THE CARRIER STRIP

(75) Inventors: Gerd Daubinger, Munich (DE); Hendrik A. van Egeraat, Oerebro (SE)

(73) Assignee: Hilti Aktiengesellschaft, Schaan (LI)

(*) Notice: Subject to any disclaimer, the term of this patent is extended or adjusted under 35 U.S.C. 154(b) by 0 days.

(21) Appl. No.: 09/473,679

(22) Filed: Dec. 29, 1999

(30) Foreign Application Priority Data

Dec. 29, 1998 (DE) .............................................. 198 60 667

(51) Int. Cl.$^7$ .................................................. B65D 85/24
(52) U.S. Cl. ............................................ 206/343; 411/442
(58) Field of Search ................................... 206/343–347; 411/442, 443

(56) References Cited

U.S. PATENT DOCUMENTS

| | | | |
|---|---|---|---|
| 3,212,632 | * 10/1965 | Baum et al. | 206/347 |
| 3,587,842 | * 6/1971 | Keck et al. | 206/347 |
| 4,121,715 | * 10/1978 | Hodil, Jr. | 206/347 |
| 4,306,654 | * 12/1981 | Grube | 206/343 |
| 5,522,687 | * 6/1996 | Chen | 411/442 |
| 5,836,732 | * 11/1998 | Gupta et al. | 206/347 |

\* cited by examiner

*Primary Examiner*—Jim Foster

(74) *Attorney, Agent, or Firm*—Sidley Austin Brown & Wood LLP

(57) ABSTRACT

A carrier strip for fastening elements and including a plurality of ring-shaped receiving members (1) for receiving the fastening elements (5), with the receiving members (1) having each a receiving opening (2) and being arranged one after another and connected with each other, and with each two adjacent receiving members (1) being offset relative to each other in a direction parallel to a longitudinal axis of the receiving opening (2).

6 Claims, 2 Drawing Sheets

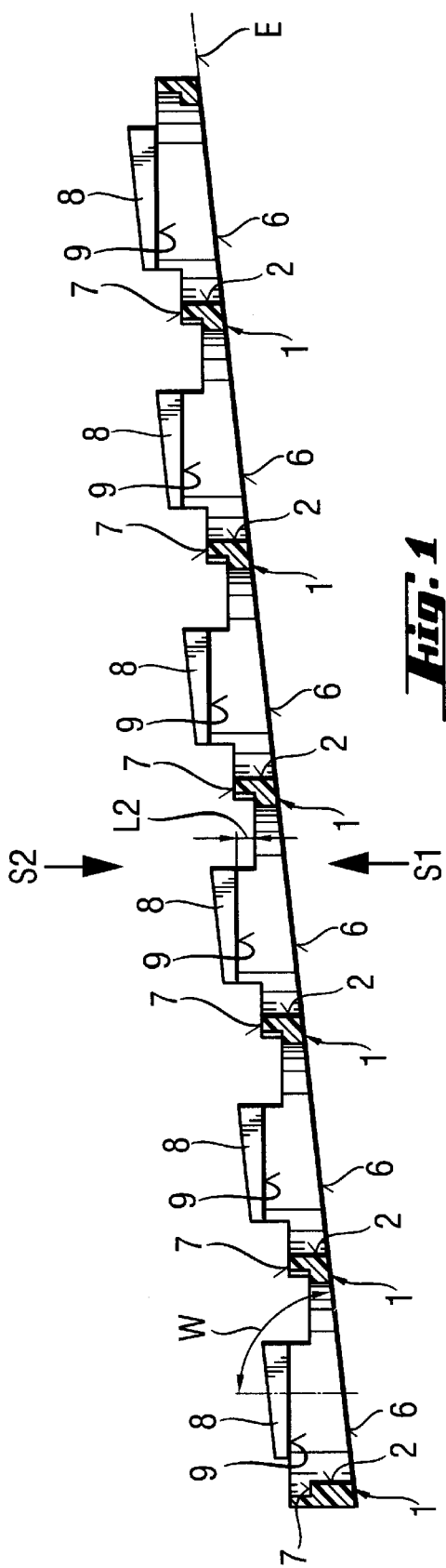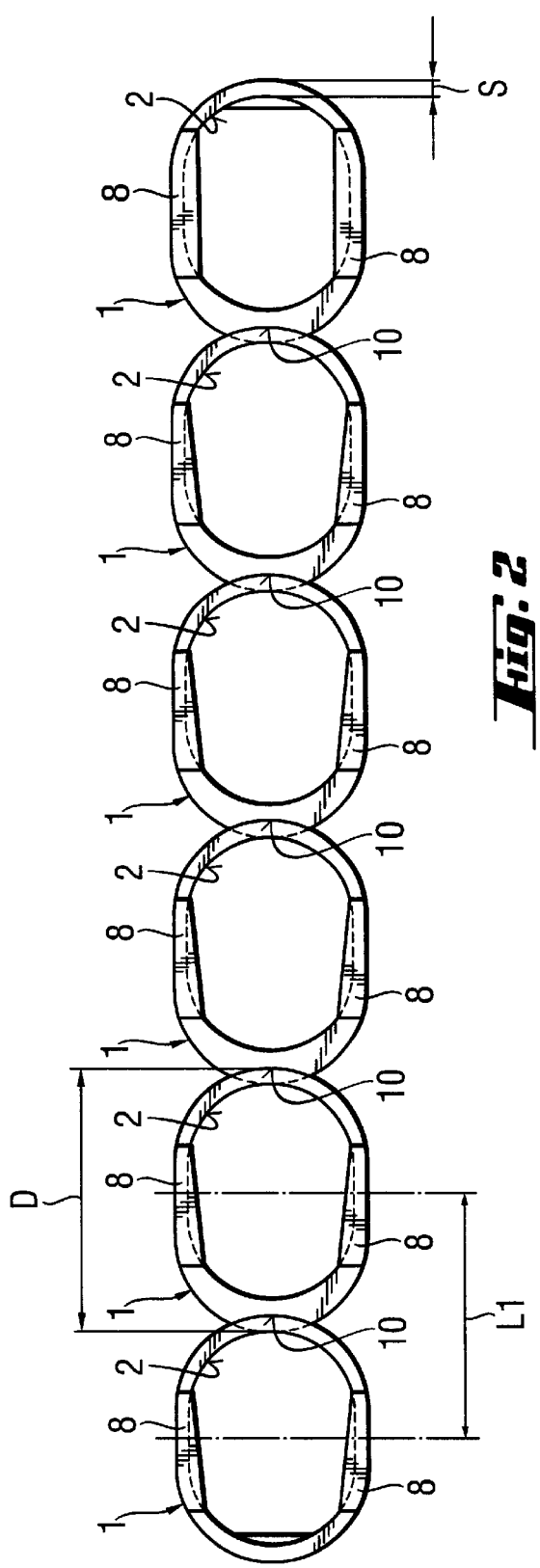

CARRIER STRIP FOR FASTENING ELEMENTS AND A MAGAZINE WITH THE CARRIER STRIP

BACKGROUND OF THE INVENTION

1. Field of the Invention

The present invention relates to a carrier strip for fastening elements having each a head and a stem, with the carrier strip including a plurality of ring-shaped receiving members for receiving the fastening elements, which receiving members have each a receiving opening and are arranged one after another and are connected with each other; and a magazine with such a carrier strip.

2. Description of the Prior Art

Carrier strips, which are formed of a plurality of arranged one after another and connected with each other, receiving members having each a receiving opening for receiving a fastening element, and which are used for delivery of nail-shaped fastening elements into a hand-held tool with which the fastening elements are driven in a constructional component, are well known.

Swiss patent No. 588,926 discloses, e.g., an explosive powder-operated setting tool in which such carrier strips are used. The carrier strip is inserted in a magazine which, when inserted into the setting tool, extends transverse to a fastening element guide that is provided in the region of the tool facing in the setting direction and extends in a direction of the longitudinal axis of the tool. This arrangement of the magazine in a setting tool makes access to separate fastening elements very difficult.

Accordingly, an object of the present invention is to provide a carrier strip which can be easily loaded with fastening elements.

Another object of the present invention is to provide a carrier strip from which the fastening elements can be easily ejected and delivered to the fastening element guide at an angle which would insure a better access to the fastening points.

SUMMARY OF THE INVENTION

These and other objects of the present invention, which will become apparent hereinafter, are achieved by providing a carrier strip in which each two adjacent receiving members are offset relative to each other in a direction parallel to the longitudinal axis of the receiving openings of the adjacent receiving members.

The design of the carrier strip according to the present invention permits to arrange the carrier strip at an acute angle to the fastening element guide so that the longitudinal axes of the fastening element extend parallel to the longitudinal extent of the fastening element guide.

The offset of the adjacent receiving members relative to each other depends on the angle at which the magazine extends to the fastening element guide. Preferably, the offset between the adjacent receiving members corresponds to 0.02 to 0.2 of the distance between the longitudinal axes of the two adjacent receiving members.

A large supporting surface of the carrier strip on the first side of the carrier strip is advantageously achieved by arranging first end surfaces of all of the receiving members on the first side of the carrier strip in a common plane which extends to longitudinal axes of the receiving openings at an angle from 60° to 98°.

As it has already been discussed above, each receiving member serves for receiving and guiding a single fastening element formed, e.g., as a screw. Each of the fastening elements has a stem which extends through the receiving opening, with the head of the fastening element lying on the second end surface of the receiving member. The axial positioning of the fastening element in the receiving opening is insured with at least one retaining member which projects from the second end surface and has a retaining surface which is axially spaced from the second end surface by a predetermined distance, is located adjacent to the second end surface, and extends into an axial projection of an inner width of the receiving opening.

In order to provide for the axial positioning of the fastening element in the receiving body or member without any play, the distance between the retaining surface of the retaining member and the second end surface of the receiving member is selected so that it corresponds to the height of the head of the fastening element measured in a direction parallel to the longitudinal axis of the fastening element. Preferably, the distance between the retaining surface and the second end surface of the retaining member corresponds to from 0.02 to 0.2 of the distance between longitudinal axes of two adjacent receiving members.

A particular good guidance of the fastening element in the carrier strip is achieved when the receiving member has two retaining members arranged diametrically opposite each other. These retaining members, e.g., can be offset sidewise with respect to the central axis of the carrier strip. The largest extent of the retaining member runs, e.g., parallel to the longitudinal extent of the carrier member.

Preferably, the receiving member have a substantially oval shape, with the largest diameter extending parallel to the longitudinal extent of the carrier strip. The largest diameter corresponds, e.g., to the diameter of the head of the fastening element to be received in the carrier strip. This insures that the head of the fastening element will not project into the receiving opening of the receiving member but will be retained by respective sections of the second end surface of the receiving member, as it would be explained in more detail below. The retaining members serve for the axial positioning of the fastening element in the receiving member. They engage the head of the fastening element from beneath, at least partially.

The inner profile of the retaining member, which lies between the retaining surface and the second end surface of the receiving member is substantially aligned with the inner profile of the receiving member and, upon insertion of a fastening element into the carrier strip, radially expands the corresponding receiving opening so that assumes, at the end, a substantially circular shape. The receiving opening widens because the inner profile at the retaining member abuts the outer profile of the head of the fastening element.

The axial support of the fastening elements in the setting direction is provided by sections of the second end surfaces of the receiving members which lie in the connection regions of separate receiving members. The head of the fastening element does not lie on the second end surface in the region of the retaining member.

The extraction of a fastening element from a carrier strip is effected with a tool connected with the setting tool with which the fastening element is driven into a constructional component. Upon the application of a pressure force to the setting tool, the extraction tool applies a pressure to the head of the fastening element. The application of an adequate pressure force would result in widening of the receiving member in the connection region in a radial direction, and the sections of the second end surface would not project any more into the projection surface of the head of the fastening element.

In order that the carrier strip can be formed as short as possible, preferably, the largest diameter of a receiving member is greater than the distance between two longitudinal axes of two adjacent receiving members. With this design, the heads of the fastening elements partially overlap each other when the fastening elements are arranged in the carrier ship. In this case, the removal of separate fastening elements can be effected one after another only after the fastening element the head of which is located below is removed. The offset of two adjacent receiving members relative to each other corresponds at least to the height of the head of the fastening element.

For manufacturing reasons, advantageously, a recess is provided in a connection region of each two adjacent receiving members and which extends from the second end surface of one of the two receiving members to the second end surface of another of the two receiving members which is offset relative to the one receiving member in a direction parallel to the longitudinal axes of the receiving openings.

Preferably, the carrier strip and the fastening elements, which are retained in the carrier strip, form together a magazine of fastening elements that can be quickly and easily inserted into a setting tool.

The novel features of the present invention, which are considered as characteristic for the invention, are set forth in particular in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 1 a schematic, cross-sectional view of a carrier strip according to the present invention;

FIG. 2 a plan view of the carrier strip shown in FIG. 1;

DETAILED DESCRIPTION OF THE PREFERRED EMBODIMENT

Figure 3:
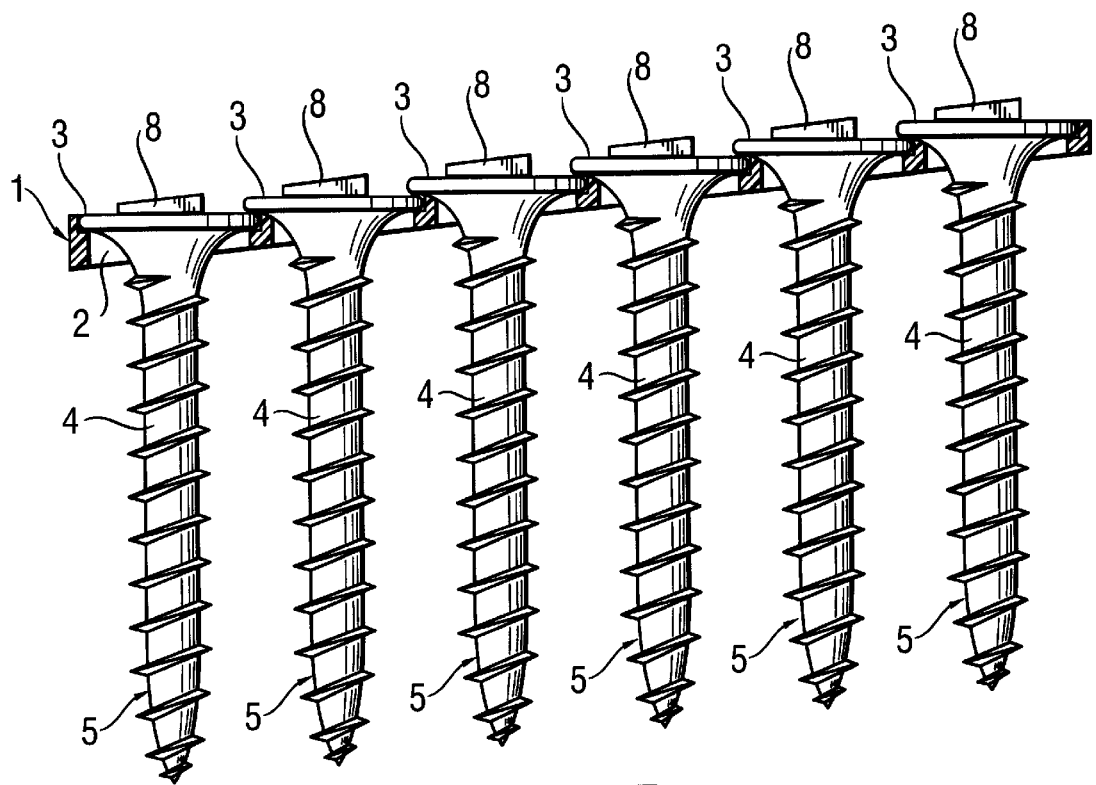
FIG. 3 a partially cross-sectional view of a magazine for fastening elements according to the present invention with a carrier strip with a plurality of fastening elements.

A carrier strip according to the present invention, which is shown in FIGS. 1–2, is formed of a plurality of ring-shaped receiving members 1 each having a receiving opening 2. The separate ring-shaped members 1 are arranged in a row, one after another, and are connected with each other. Each receiving member 1 receives a single fastening element 5 and has first and second end surfaces 6 and 7, respectively.

The side of the carrier strip, on which all of the first end surfaces 6 of the receiving members 1 are arranged, is designated with a reference sign S1 and forms a first side of the carrier strip, and the side of the carrier strip, on which all of the second end surfaces 7 of the receiving members 1 are arranged, is designated with a reference sign S2 and forms a second side of the carrier strip. The first end surface 6 extends to a longitudinal axis of each receiving member 1 at an angle W, and all of the first end surfaces 6 of all of the receiving members 1 lie in a common plane E.

Two diametrically opposite retaining members 8 project from the second end surface 7 of each receiving member 1. Each of the retaining members 8 is offset sidewise relative to the longitudinal axis of the carrier strip and has a retaining surface 9 a largest extent of which runs parallel to the longitudinal axis of the carrier strip. The retaining surface 9 is located adjacent to the second end surface 7 of a respective receiving member 1, is spaced by a certain amount from the second end surface 7, and extends into an axial projection of the inner diameter of the receiving opening 2.

As shown in FIG. 2, the receiving member 1 has a shape of an oval which insures a largest extension of the receiving member 1 in a direction parallel to the longitudinal extent of the carrier strip. Each section of the retaining member 8 between the second end surface 7 and the retaining surface 9 has an inner profile adjacent to the receiving opening 2 and extending substantially parallel to the inner profile of the adjoining section of the receiving member 1. The distance L1 between two longitudinal axes of two adjacent receiving members 1 is smaller than the largest outer diameter 2 of each of the receiving member 1 which extends parallel to the longitudinal extent of the carrier strip. The smallest wall thickness of the receiving member is designated with a reference sign S.

In the connection region of two adjacent receiving members 1, there is provided a recess 10. The recess 10 extends from the second end surface 7 of a first receiving member 1 into the outer profile of the receiving member 1 up to the second end surface 7 of a second receiving member 1 which is offset with respect to the first receiving member in a direction parallel to the longitudinal axes of the two receiving members 1.

Figure 4:
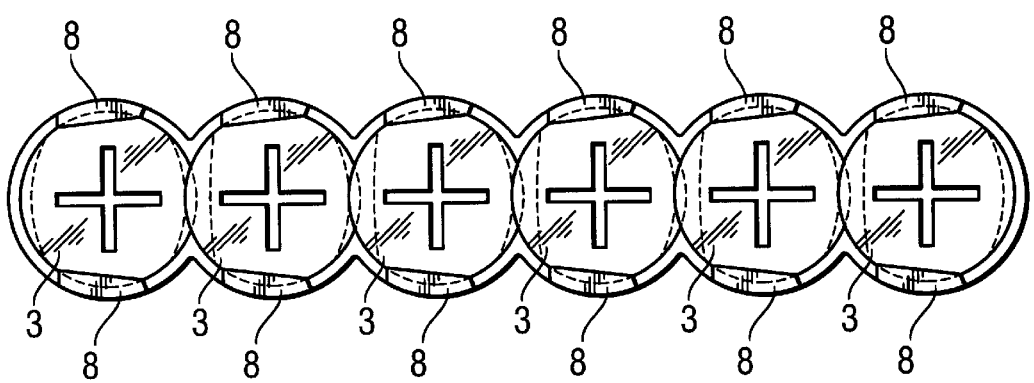
FIG. 4 a plan view of the magazine for fastening elements shown in FIG. 3.

In a magazine for fastening elements, which is shown in FIG. 3, a fastening element 5, which is formed as a screw with a stem 4, extends through the receiving opening 2 of a respective receiving member 1. The inner diameter of the receiving opening 2 is noticeably larger than the outer diameter of the stem 4 of the receiving element 5 in the region of the flank of the screw thread. The head 3 of the fastening element 5, which extends radially far beyond the stem diameter, lies on the second end surface 7 of the corresponding receiving member 1. The axial positioning of the fastening element 5 in the carrier strip is insured by the retaining surfaces 9 of the retaining members 8 which partially engage the head 3 of the fastening element 5 from beneath, as shown in FIG. 4. The distance L2 of the retaining surface 9 from the second end surface 7 corresponds substantially to the height of the head 3 of the fastening element 5.

Though the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A carrier strip for fastening elements having each a head (3) and a stem (4), the carrier strip comprising a plurality of ring-shaped receiving members (1) for receiving the fastening elements (5), the receiving members (1) having each a receiving opening (2) and being arranged one after another and connected with each other, with each two adjacent receiving members (1) being offset relative to each other in a direction parallel to a longitudinal axis of the receiving opening (2), wherein each receiving member (1) has a first end surface (6) which lies on a first side (S1) of the carrier strip in a plane (E) and which extends to the at an angle (W) from 60° to 98°, and has a second end surface (7) located opposite the first end surface (6), and at least one retaining member (8) which projects from the second end surface (7) and has a retaining surface (9) which is axially spaced from the second end surface (7) by a distance (12), is located adjacent to the second end surface, and extends into an axial projection of an inner width of the receiving opening.(2).

2. A strip carrier as set forth in claim 1, wherein the distance (L2), by which the retaining surface (9) is spaced from the second end surface (7), corresponds to from 0.02 to 0.2 of a distance between the longitudinal axes of the two adjacent receiving members (1).

3. A strip carrier as set forth in claim 1, wherein each receiving member (1) has two retaining members.

4. A strip carrier as set forth in claim 1, comprising a recess provided in a connection region of each two adjacent receiving members and extending from the second end surface (7) of one of the two receiving members to the second end surface (7) of another of the two receiving members (1) which is offset relative to the one receiving member in a direction parallel to the longitudinal axes of the receiving opening (2).

5. A carrier strip for fastening elements having each a head (3) and a stem (4), the carrier strip comprising a plurality of ring-shaped receiving members (1) for receiving the fastening elements (5), the receiving members (1) having each a receiving opening (2) and being arranged one after another and connected with each other, with each two adjacent receiving members (1) being offset relative to each other in a direction parallel to a longitudinal axis of the receiving opening (2), wherein the receiving member (1) has a substantially oval shape, with a largest diameter (D) extending parallel to a longitudinal extent of the carrier strip.

6. A carrier strip as set forth in claim 5, wherein the largest diameter of the receiving member is greater than a distance (L1) between the longitudinal axes of the two adjacent receiving members (1).

\* \* \* \* \*